United States Patent
Suzuki

[11] Patent Number: 5,694,441
[45] Date of Patent: Dec. 2, 1997

[54] PHASE SYNCHRONIZING APPARATUS, DECODER AND SEMICONDUCTOR INTEGRATED CIRCUIT DEVICE

[75] Inventor: Teruo Suzuki, Kasugai, Japan

[73] Assignee: Fujitsu Limited, Kawasaki, Japan

[21] Appl. No.: 666,236

[22] Filed: Jun. 20, 1996

[30] Foreign Application Priority Data

Jul. 31, 1995 [JP] Japan .................. 7-195324

[51] Int. Cl.$^6$ .................................................. H04L 7/04
[52] U.S. Cl. ................................. 375/362; 327/160
[58] Field of Search ............................. 375/362, 354, 375/359, 282, 371; 370/100.1, 503; 327/160, 155, 141

[56] References Cited

U.S. PATENT DOCUMENTS

| | | | |
|---|---|---|---|
| 5,127,023 | 6/1992 | Tash ........................... | 375/282 |
| 5,187,720 | 2/1993 | Shibata et al. ............... | 375/377 |
| 5,349,610 | 9/1994 | Sakamoto et al. ........... | 375/354 |
| 5,519,500 | 5/1996 | Kumamoto .................. | 358/296 |
| 5,594,763 | 1/1997 | Nimishakavi ................ | 375/376 |

*Primary Examiner*—Stephen Chin
*Assistant Examiner*—Betsy Lee Deppe
*Attorney, Agent, or Firm*—Nikaido, Marmelstein, Murray & Oram LLP

[57] ABSTRACT

A phase synchronizing apparatus that operates with a low power consumption so as to be particularly suited for use in battery powered data communications situations. The phase synchronizing apparatus receives reception data containing a data code portion synchronous with a transmission clock of a predetermined frequency and produces a reception clock synchronous with the transmission clock. The phase synchronizing apparatus uses a synchronization counter and a compensation circuit to achieve the phase synchronization. The invention can also be implemented as a decoder for decoding data received from a data transmission or as an integrated circuit for data communication.

10 Claims, 13 Drawing Sheets

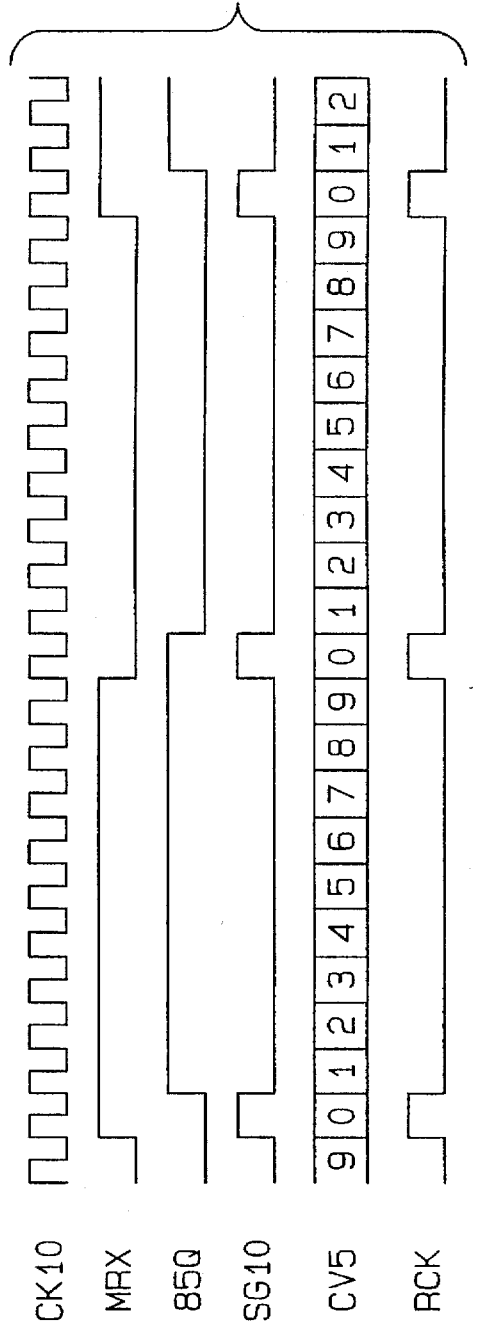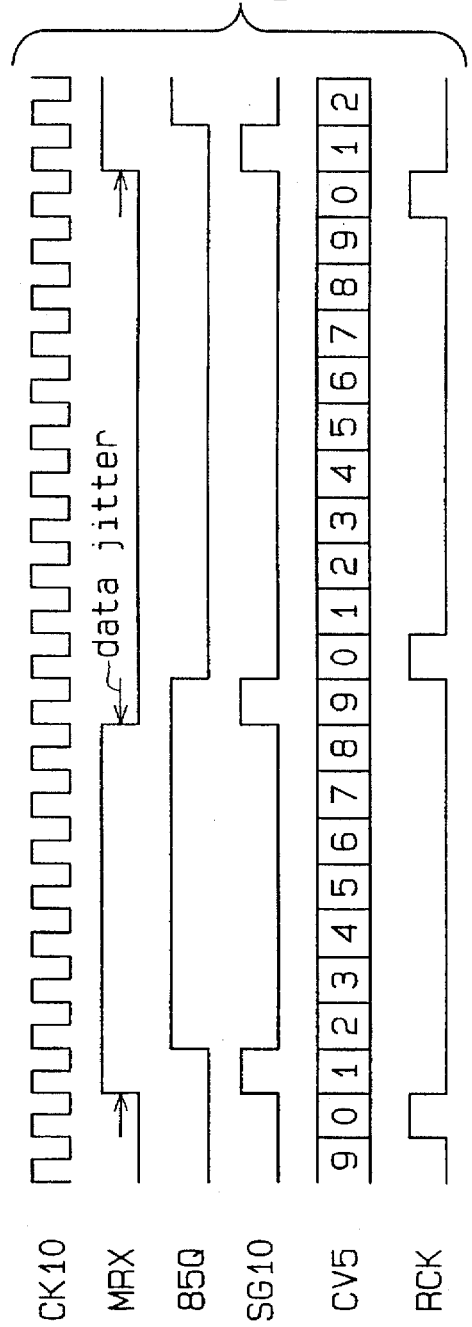

reset released

| count value | B4 | B3 | B2 | B1 |
|---|---|---|---|---|
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| -5 | 1 | 0 | 1 | 1 |
| -4 | 1 | 1 | 0 | 0 |
| -3 | 1 | 1 | 0 | 1 |
| -2 | 1 | 1 | 1 | 0 |
| -1 | 1 | 1 | 1 | 1 |

PHASE SYNCHRONIZING APPARATUS, DECODER AND SEMICONDUCTOR INTEGRATED CIRCUIT DEVICE

BACKGROUND OF THE INVENTION

1. Field of the Invention

The present invention relates generally to a phase synchronizing apparatus and, more particularly, to a digital PLL decoder for use in data communications.

2. Description of the Related Art

Data communications between personal computers, including notebook type personal computers, has become popular. The notebook type personal computers are powered by batteries. Since chargeable amounts of batteries are limited, the work time of notebook type personal computers is restricted. One way of extending the limited work time is to reduce the power consumed by an integrated circuit (e.g., LSI) device incorporated into notebook type personal computers.

A Manchester code is one type of data for data communications between individual terminals or personal computers via a Local Area Network (LAN). Each block of bits of transmission data using the Manchester code also carries information about a transmission clock of a predetermined frequency.

As shown in FIG. 1, transmission data has a data code portion 95 which is determined by the rising edge and/or falling edge synchronous with the transmission clock of the predetermined frequency. The transmission of data over the data transfer paths of a LAN tends to suppress a signal change at the edge portion of the waveform of transmission data, as shown in FIG. 1.

A terminal on the reception side sets a predetermined threshold level with respect to transmission data, and reproduces the edge of the data code portion while referring to the threshold level. In other words, the rising edge of the data code portion is reproduced when the level of a transfer signal exceeds the threshold level, and the falling edge of the data code portion is reproduced when the level of the transfer signal falls below the threshold level. The reproduced data code portion is used to produce a reception clock which is then used to obtain the reception data. Depending on the threshold level, therefore, a rightward data jitter 96a or 96c, or a leftward data jitter 96b may appear on the reception data. As long as the frequency of the transmission clock and the threshold level are constant, two adjacent data jitters (e.g., 96a and 96b) are shifted by the same amount in the opposite directions. Therefore, the two adjacent data jitters cancel out each other, causing no frequency shift between the transmission clock and reception clock.

A LAN control apparatus incorporated in each terminal on the reception side is equipped with a digital PLL decoder which has a phase synchronizing apparatus. Based on a transmission clock included in transmission data, the phase synchronizing apparatus produces a reception clock synchronous with the transmission clock.

FIG. 2 shows a conventional digital PLL decoder 81 coupled to a level converter 80. The level converter 80 converts the voltage levels of complementary reception data MRXP and MRXN which are output from an unillustrated data reception circuit, yielding reception data MRX, and outputs the reception data MRX to the digital PLL decoder 81.

The digital PLL decoder 81 has a phase synchronizing apparatus 82 and a decoding section 83. The phase synchronizing apparatus 82 includes an edge signal generator 84, a synchronization counter 87, a register 88, a determination circuit 89, a compensation counter 90 and a compensation signal generator 91.

The edge signal generator 84 has a data flip-flop (hereinafter "DFF") 85 and an exclusive OR (EOR) gate 86. The DFF 85 latches the data code portion of the reception data MRX based on a reference clock CK10 whose frequency is an integer multiple of the frequency of the transmission clock, e.g., ten times the latter frequency. The EOR gate 86 outputs an edge signal SG10 synchronous with the data code portion of the reception data MRX, based on the reception data MRX and the output signal 85Q of the DFF 85 as shown in FIG. 3A.

The synchronization counter 87 counts the number of pulses of the reference clock CK10. The synchronization counter 87 has a count value CV5 which increases by one every time it counts one pulse of the reference clock CK10. The count value CV5 will repeatedly increase up to a predetermined value ("9" in this case) from "0" and then return to "0" again. The synchronization counter 87 also outputs a reception clock RCK to the decoding section 83 every time the count value CV5 becomes zero, as shown in FIGS. 3A and 3B. The set number of pulses for the synchronization counter 87 cause the count value CV5 to return to "0", i.e., the timing at which the reception clock RCK is output, can be altered by an external signal.

The count value CV5 output by the synchronization counter 87 is forwarded to the register 88. The register 88 receives the count value CV5 of the point when the rising edge of the edge signal SG10 has been input, and simultaneously sends it as an output V10 to the determination circuit 89.

In accordance with the value of the output V10, the determination circuit 89 outputs an up signal SU or a down signal SD to the compensation counter 90. The up signal SU increases a count value CV6 retained in the compensation counter 90, while the down signal SD decreases the count value CV6. When there is no data jitter in the reception data MRX as shown in FIG. 3A, for example, the count value CV5 synchronous with the rising edge of the edge signal SG10 is always zero. The determination circuit 89 therefore outputs neither the up signal SU nor the down signal SD. When a data jitter is present in the reception data MRX as shown in FIG. 3B, on the other hand, the count value CV5 synchronous with the rising edge of the edge signal SG10 becomes "1", "9", "1", and so forth. Therefore, the determination circuit 89 outputs the up signal SU to the compensation counter 90 in response to the count value of "1" or outputs the down signal SD to the compensation counter 90 in response to the count value of "9".

The compensation counter 90 increments the count value CV6 by "1" when the up signal SU is input, and decrements the count value CV6 by "1" when the down signal SD is input. The compensation counter 90 outputs the count value CV6 to the compensation signal generator 91. When the absolute value of the count value CV6 becomes equal to or greater than a predetermined value, the compensation signal generator 91 outputs signals SL4 to SL6 for setting and altering the number of pulses for the count value CV5 of the synchronization counter 87.

In the case where the frequency of the transmission clock of transmission data is kept at the previously set value, the deviation of the rightward data jitter 96a of reception data from the edge 95 of the data code portion of the transmission data becomes equal to the deviation of the leftward data jitter 96b from the edge 95 of the data code portion, as shown in FIG. 1. At this time, the number of the up signals SU and the number of the down signals SD, both to be output to the compensation counter 90 from the determination circuit 89, become equal to each other. In other words, when data has many data jitters, the count value CV5 of the synchronization counter 87 (synchronous with the rising edge of the edge signal SG10) repeats alternately taking the values of, for example, "1" and "9" according to which the determination circuit 89 keeps alternately outputting the up signal SU and down signal SD. In this case, the output number of the up signals SU equals the output number of the down signals SD, so that the outputting of those signals does not substantially affect a change in the count value CV6 of the compensation counter 90. That is, the determination circuit 89 eventually repeats the operation of producing two signals SU and SD which do not influence the operation of the synchronization counter 87.

Ethernet LANs, using 10BASE-T or 10BASE-5, use the specified data transfer rate of 10 Mbps. In such cases, the frequency of the reference clock to be used in the phase synchronizing apparatus should be set to 80 to 100 MHz. In general, the consumed current I in such a circuit is represented by I=C·V·f, where C is the capacitance, V is the voltage and f is the frequency. Since the conventional determination circuit 89 and compensation counter 90 repeat the substantially insignificant operations mentioned above, those circuits wastefully consumed power. In addition, the high frequency requirements on the reference clock to meet the high speed data transfer rate is likely to further increase the power consumed by the wasteful operations of the determination circuit 89 and the compensation counter 90.

In the field of digital PLL decoders which are installed in personal computers for use in LANs, particularly battery powered personal computers, there is a need for a phase synchronizing apparatus which is capable of suppressing the power consumption caused by such wasteful operation.

SUMMARY OF THE INVENTION

Broadly speaking, the present invention relates to a phase synchronizing apparatus that operates with a low power consumption. Hence, the invention is particularly suited for use in battery powered situations such as portable computers. The invention can be implemented in numerous ways, including as a phase synchronizing apparatus, as a decoder for decoding data received from a data transmission, or as an integrated circuit for data communication. Several embodiments of the invention are described below.

As a phase synchronizing apparatus for receiving reception data containing a data code portion synchronous with a transmission clock of a predetermined frequency and producing a reception clock synchronous with the transmission clock, an embodiment of the invention includes: a synchronization counter for receiving a first reference clock whose frequency is an integer multiple of the frequency of the transmission clock, and counting a number of pulses of the first reference clock to output a count value, the count value including positive and negative values, the synchronization counter outputting a count-up signal as the reception clock when the count value reaches a predetermined count-up set value; and a compensation circuit for receiving the count value from the synchronization counter and changing the count-up set value in the synchronization counter based on the count value to compensate for a deviation of the phase of the reception clock with respect to the phase of the transmission clock. Preferably, the count value of the synchronization counter sequentially increases from 0 to reach a predetermined positive value, and then changes to a predetermined negative value and sequentially increases to 0 from the predetermined negative value as the number of pulses of the transmission clock are counted.

As a decoder, an embodiment of the invention includes: a phase synchronizing apparatus as in the above embodiment, and a decoding section for outputting data consisting of an NRZ (Non Return to Zero) code based on each data code portion of the reception data and for outputting a count-up signal from the synchronization counter as the reception clock.

As a semiconductor integrated circuit device, an embodiment of the invention includes: a transceiver for receiving data transferred via a transfer path and having a data code portion synchronous with a transmission clock of a predetermined frequency; a decoder as in the above embodiment, the decoder for producing the reception clock synchronous with the transmission clock in reception data received by the transceiver based on the reception data and for outputting data consisting of an NRZ code based on each data code portion of the reception data received by the transceiver; a data link controller for latching the data consisting of the NRZ code based on the reception clock; and a system interface provided to output the data latched by the data link controller.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with objects and advantages thereof, may best be understood by reference to the following detailed description together with the accompanying drawings, wherein:

FIG. 3A is a timing diagram illustrating the operation of a conventional phase synchronizing apparatus when there are no data jitters;

FIG. 3B is a timing diagram illustrating the operation of the conventional phase synchronizing apparatus when there are data jitters;

DETAILED DESCRIPTION OF THE PREFERRED EMBODIMENT

Figure 4:
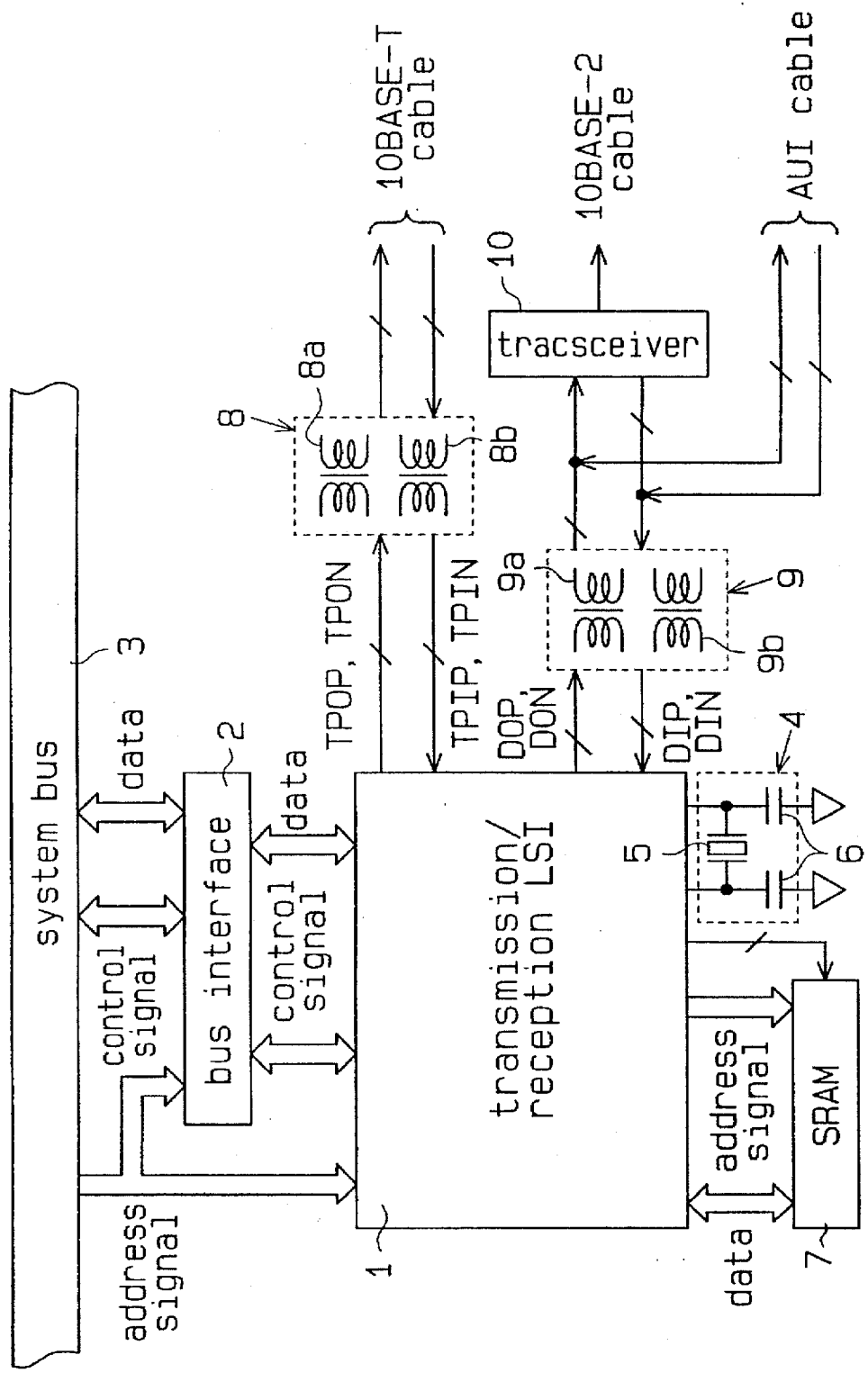
FIG. 4 is a schematic diagram depicting a LAN control apparatus according to one embodiment of the present invention.

One embodiment of the present invention will be now described with reference to FIGS. 4 through 15. FIG. 4 shows a LAN control apparatus provided on a LAN board (not shown). This LAN control apparatus comprises a large scale integrated circuit (LSI) 1 for transmission and reception of data and signals, a bus interface 2, a system bus 3, an oscillator 4, a static RAM (SRAM) 7, two transformer units 8 and 9, and a transceiver 10. The oscillator 4 has a quartz oscillator 5 and two capacitors 6. This oscillator 4 produces a clock CK1 of a predetermined frequency (20 MHz in this embodiment) and supplies this clock CK1 to the LSI 1.

The transmission/reception LSI 1 exchanges control signals and data with the system bus 3 via the bus interface 2. Address signals are directly input to the LSI 1 from the system bus 3. The LSI 1 is connected to the SRAM 7 which temporarily stores transmission data and reception data for the LSI 1.

The LSI 1 is connected to a transmission transformer 8a via a pair of output signal lines TPOP and TPON and to a reception transformer 8b via a pair of input signal lines TPIP and TPIN. The transformer unit 8 which includes the transformers 8a and 8b is connected to a 10BASE-T cable as a transfer path. The LSI 1 is also connected to a transmission transformer 9a via a pair of output signal lines DOP and DON and to a reception transformer 9b via a pair of input signal lines DIP and DIN. The transformer unit 9 which includes the transformers 9a and 9b is connected to an AUI (10BASE-5) cable as a transfer path, and is connected via the transceiver 10 to a 10BASE-2 cable as a transfer path. The transformer units 8 and 9 are provided to transfer only the amplitudes or AC components of the transmission data and reception data.

Figure 5:
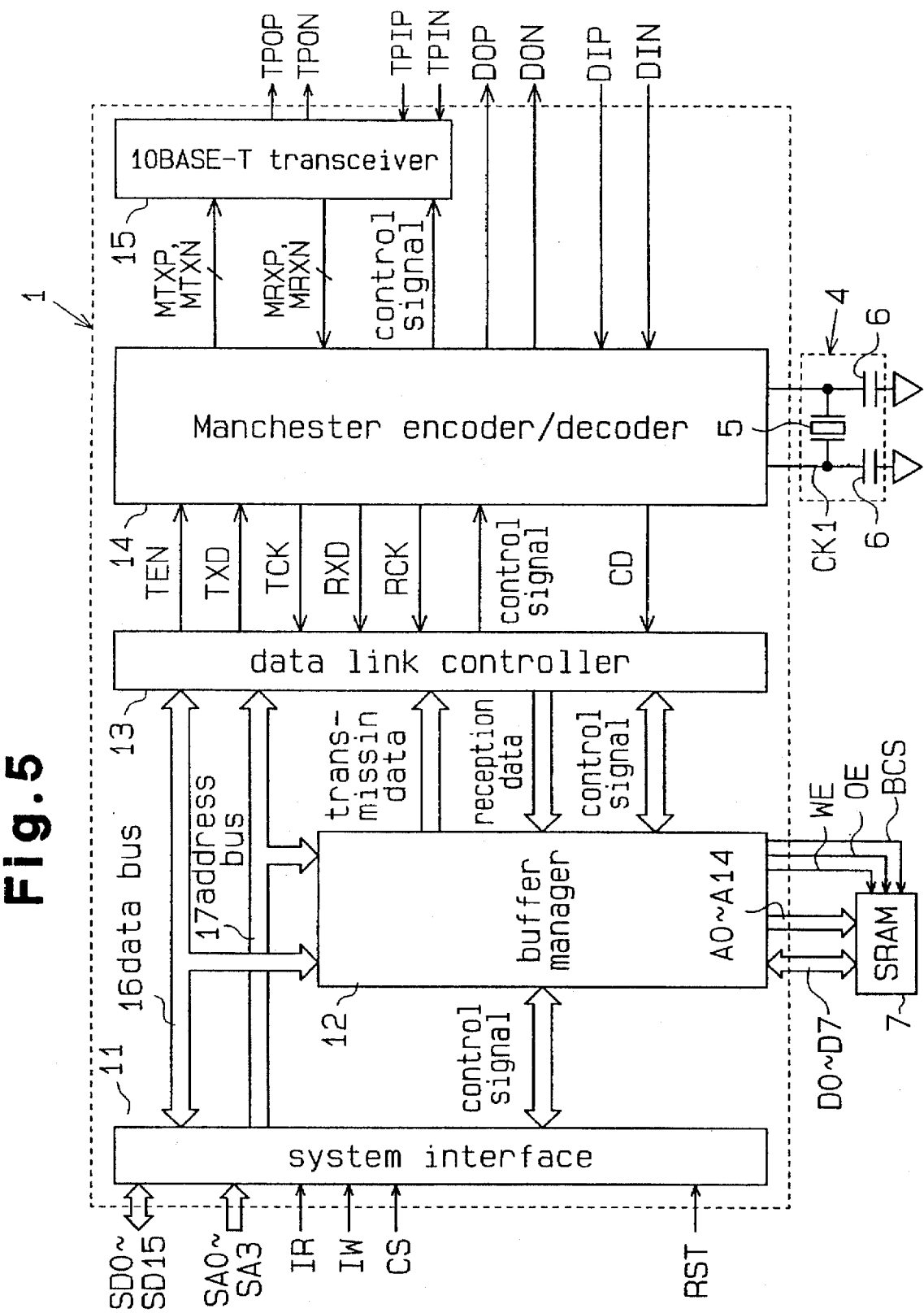
FIG. 5 is a block diagram of a transmission/reception integrated circuit.

The transmission/reception LSI 1 which is illustrated in detail in FIG. 5 includes a system interface 11, a buffer manager 12, a data link controller 13, a Manchester encoder/decoder 14 and a 10BASE-T transceiver 15. The system interface 11, the buffer manager 12 and the data link controller 13 are mutually connected by an internal data bus 16 and an internal address bus 17.

The system interface 11 exchanges data SD0 to SD15 with the aforementioned external bus interface 2. The system interface 11 also receives a read signal IR, a write signal IW, a chip select signal CS and a reset signal RST via the bus interface 2. The system interface 11 further receives address signals SA0 to SA3 from the aforementioned system bus 3.

The system interface 11 sends address signals to the buffer manager 12 and data link controller 13 via the address bus 17, and exchanges data with the buffer manager 12 and data link controller 13 via the data bus 16. The system interface 11 also exchanges control signals with the buffer manager 12.

The buffer manager 12 sends address signals A0 to A14 as well as a chip select signal BCS and a write enable signal WE or an output enable signal OE to the SRAM 7 to write data D0 to D7 into the SRAM 7 or read the data D0 to D7 therefrom.

The buffer manager 12 exchanges control signals with the data link controller 13. The buffer manager 12 transfers transmission data to the data link controller 13 in a data transmission mode, and receives reception data from the data link controller 13 in a data reception mode. The transmission data and reception data to be exchanged between the buffer manager 12 and data link controller 13 are parallel data.

The data link controller 13 is connected to the Manchester encoder/decoder 14. The data link controller 13 sends a transmission enable signal TEN to the Manchester encoder/decoder 14 in the data transmission mode. In this data transmission mode, the data link controller 13 converts parallel transmission data to serial data and transfers serial transmission data TXD to the Manchester encoder/decoder 14, bit by bit, in synchronism with a transmission clock TCK from the Manchester encoder/decoder 14.

The data link controller 13 receives a reception detection signal CD from the Manchester encoder/decoder 14 in the data reception mode. In this data reception mode, the data link controller 13 sequentially receives serial reception data RXD, bit by bit, in synchronism with a reception clock RCK from the Manchester encoder/decoder 14, and converts the received serial data to parallel data.

The Manchester encoder/decoder 14 is connected to the 10BASE-T transceiver 15. The Manchester encoder/decoder 14 is connected to the transmission transformer 9a via the output signal lines DOP and DON and to the reception transformer 9b via the input signal lines DIP and DIN. The transceiver 15 is connected to the transmission transformer 8a via the output signal lines TPOP and TPON and to the reception transformer 8b via the input signal lines TPIP and TPIN. The oscillator 4 is also connected to the Manchester encoder/decoder 14.

Figure 6:
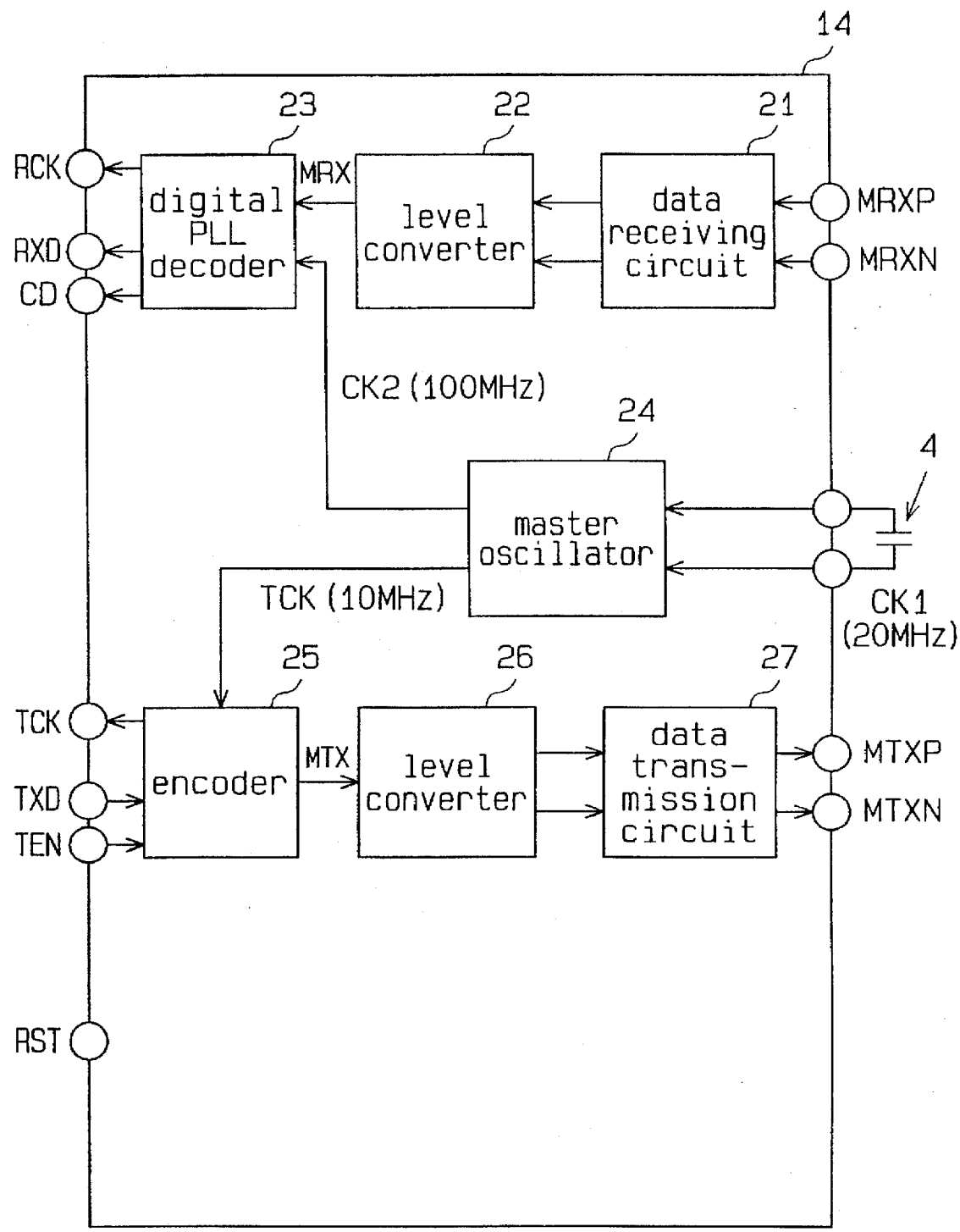
FIG. 6 is a block diagram showing a Manchester encoder/decoder.

As shown in FIG. 6, the Manchester encoder/decoder 14 includes a data receiving circuit 21, a level converter 22, a digital PLL decoder 23, a master oscillator 24, an encoder 25, a level converter 26 and a data transmission circuit 27.

The master oscillator 24 is supplied with the clock CK1 from the oscillator 4. The master oscillator 24 produces a reference clock CK2 based on the clock CK1 and supplies the clock CK2 to the digital PLL decoder 23. The master oscillator 24 also produces the transmission clock TCK based on the clock CK1 and supplies the clock TCK to the encoder 25. According to this embodiment, the frequency of the reference clock CK2 is set to an integer multiple of the frequency of the clock CK1, and the frequency of the transmission clock TCK is set to a half the frequency of the clock CK1. The frequency of the reference clock CK2 is an integer multiple the frequency of the transmission clock TCK. In the illustrated embodiment, the CK1 is 20 MHz, the clock TCK is 10 MHz (one-half of 20 MHz), and the reference clock CK2 is 100 MHz (ten times 20 MHz).

Figure 1:
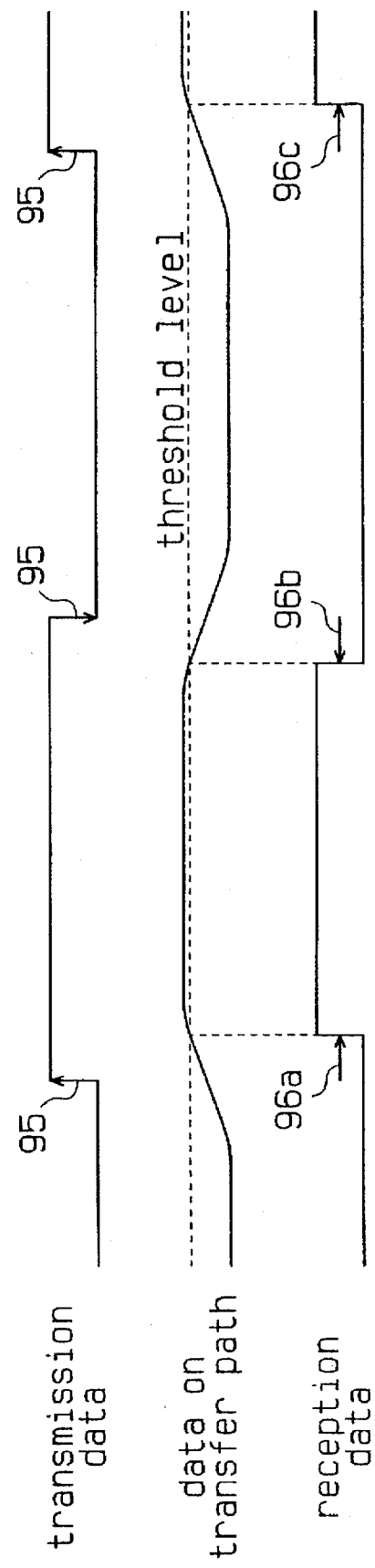
FIG. 1 is an explanatory diagram of the generation of data jitters in a LAN.
Figure 2:
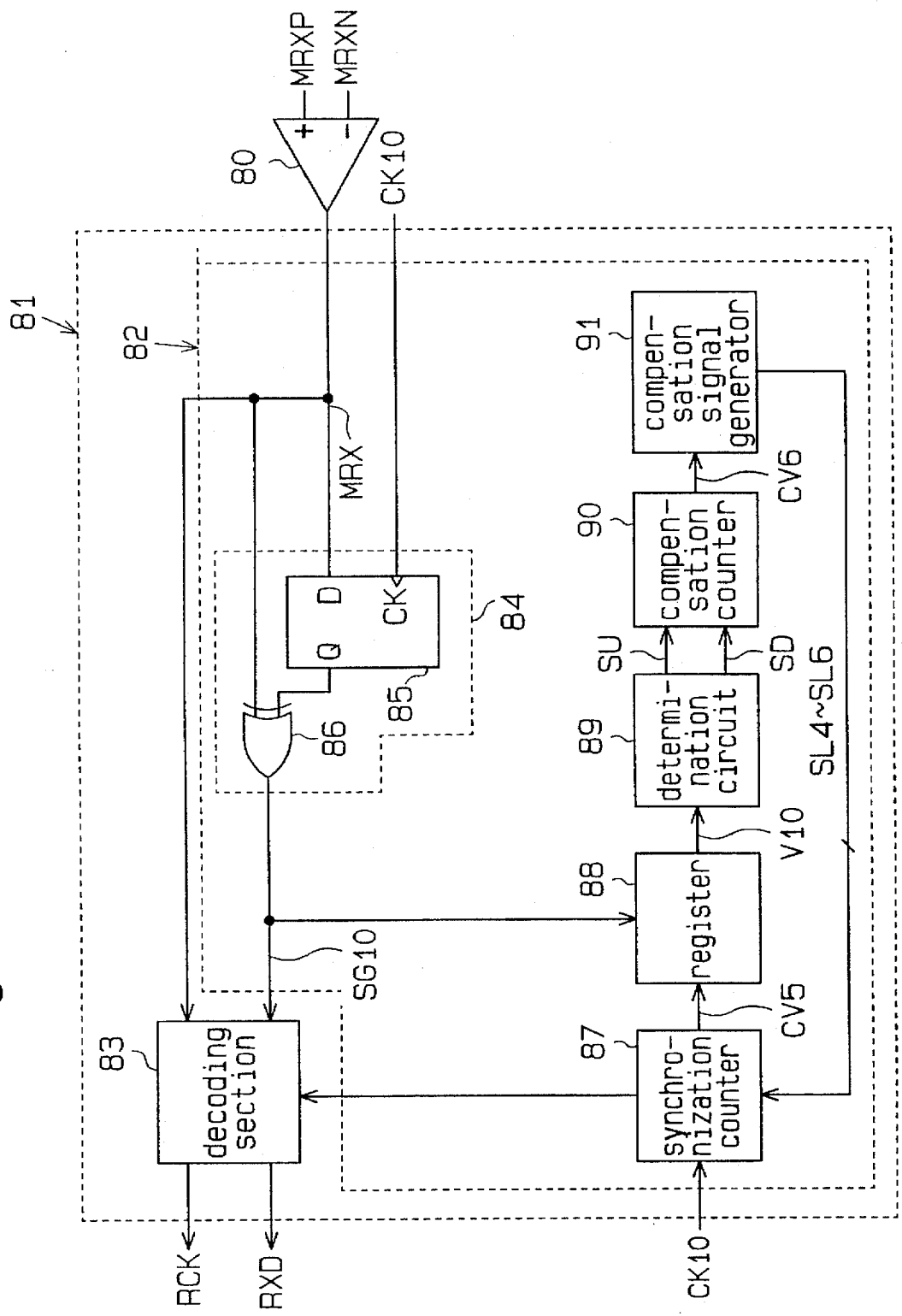
FIG. 2 is a block diagram showing a conventional digital PLL decoder.

The transmission enable signal TEN from the data link controller 13 is supplied to the encoder 25 to enable the encoder 25. When enabled, the encoder 25 sends the clock TCK to the data link controller 13 and receives serial transmission data TXD from the data link controller 13. The encoder 25 converts the received transmission data TXD to a Manchester code to produce transmission data MTX in the manner illustrated in FIG. 1, based on the transmission clock TCK.

The level converter 26 converts the voltage level of the transmission data MTX to produce complementary transmission data MTXP and MTXN, and sends the complimentary transmission data MTXP and MTXN to the 10BASE-T transceiver 15 via the data transmission circuit 27. The 10BASE-T transceiver 15 outputs the transmission data MTXP and MTXN on the output signal lines TPOP and TPON.

The data receiving circuit 21 receives the complementary reception data MRXP and MRXN from the 10BASE-T transceiver 15 and sends the complimentary received data MRXP and MRXN to the level converter 22. The level converter 22 converts the voltage levels of the complementary reception data MRXP and MRXN to produce reception data MRX and sends this reception data MRX to the digital PLL decoder 23.

The digital PLL decoder 23 produces the reception detection signal CD based on the reception data MRX and sends the signal CD to the data link controller 13. The digital PLL decoder 23 also produces the reception clock RCK and the reception data RXD. The reception clock RCK is synchronized with the transmission clock contained in the reception data MRX. The reception data RXD consists of NRZ (Non Return to Zero) codes based on the supplied reference clock CK2. Once produced, the reception clock RCK and the reception data RXD are forwarded to the data link controller 13.

Figure 7:
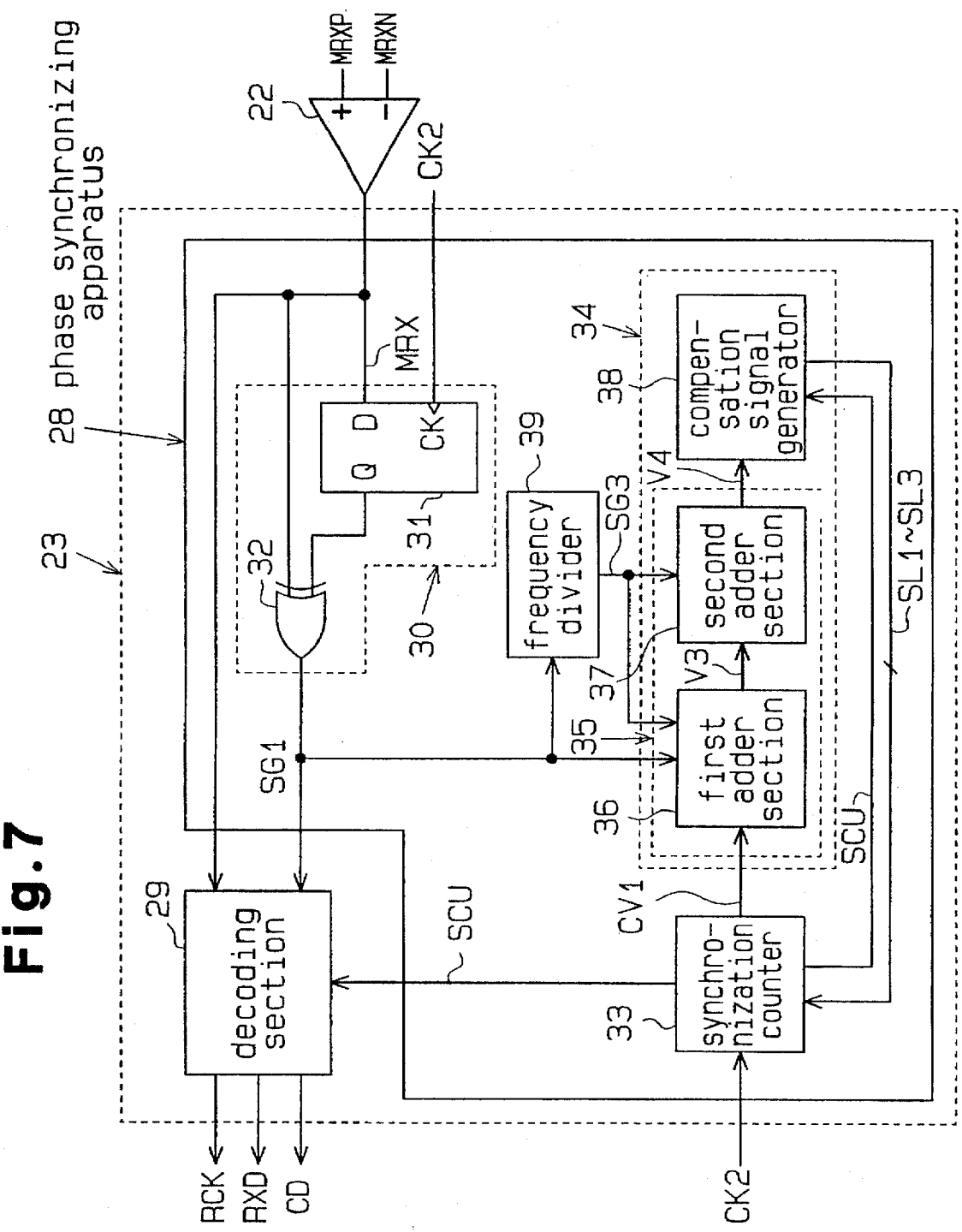
FIG. 7 is a block diagram depicting a digital PLL decoder.

FIG. 7 illustrates the detailed circuit structure of the digital PLL decoder 23. The digital PLL decoder 23 includes a phase synchronizing apparatus 28 and a decoding section 29. The phase synchronizing apparatus 28 has an edge signal generator 30, a synchronization counter 33, a compensation circuit 34, and a frequency divider 39.

Figure 8:
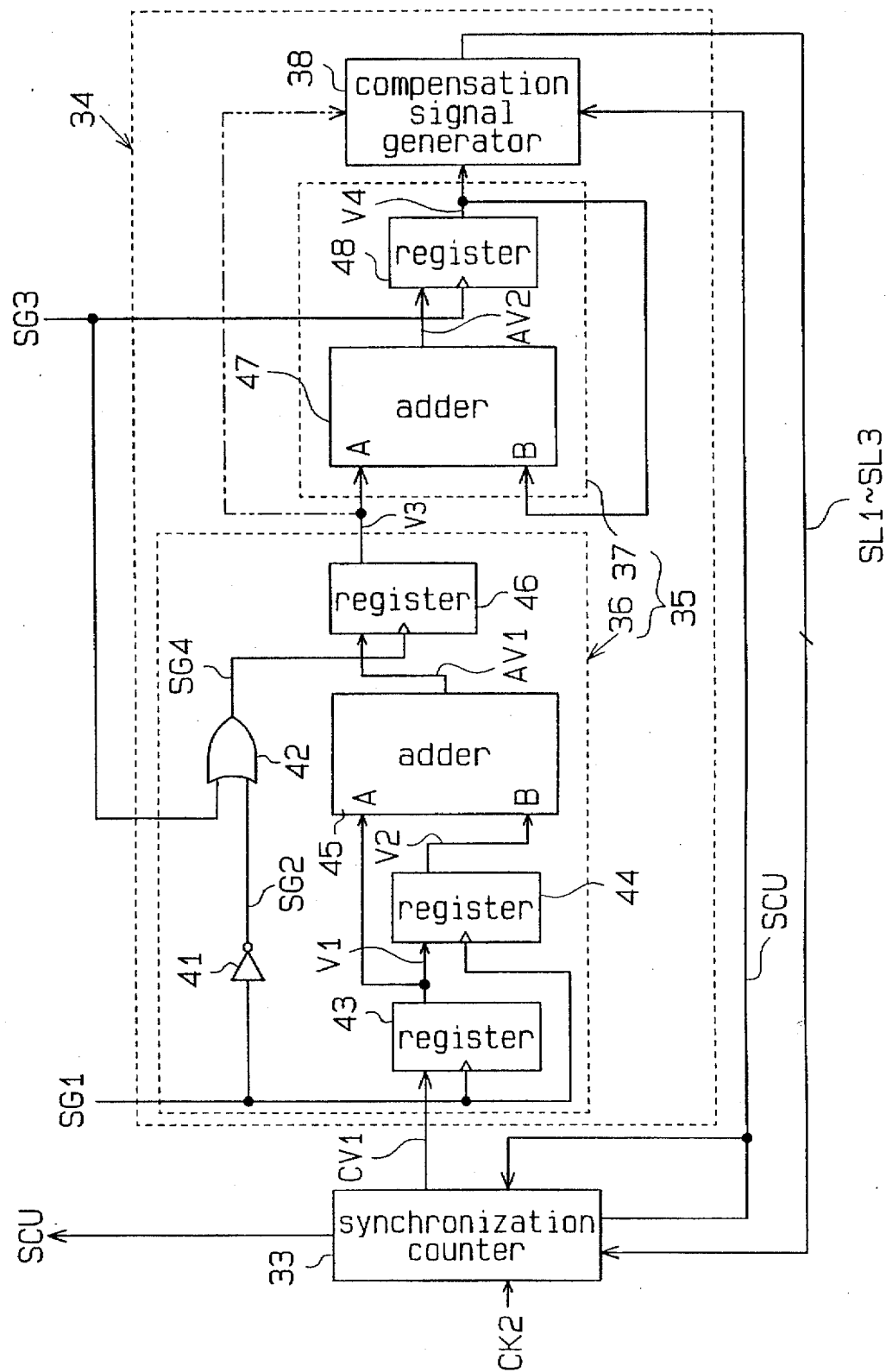
FIG. 8 is a block diagram illustrating a synchronization counter and a compensation circuit.

The edge signal generator 30 include a data flip-flop (DFF) 31 and a two-input exclusive OR (EOR) gate 32 as a logic circuit. As shown in FIGS. 7 and 8, the compensation circuit 34 includes an adder circuit 35, comprised of first and second adder sections 36 and 37, and a compensation signal generator 38.

Figure 9:
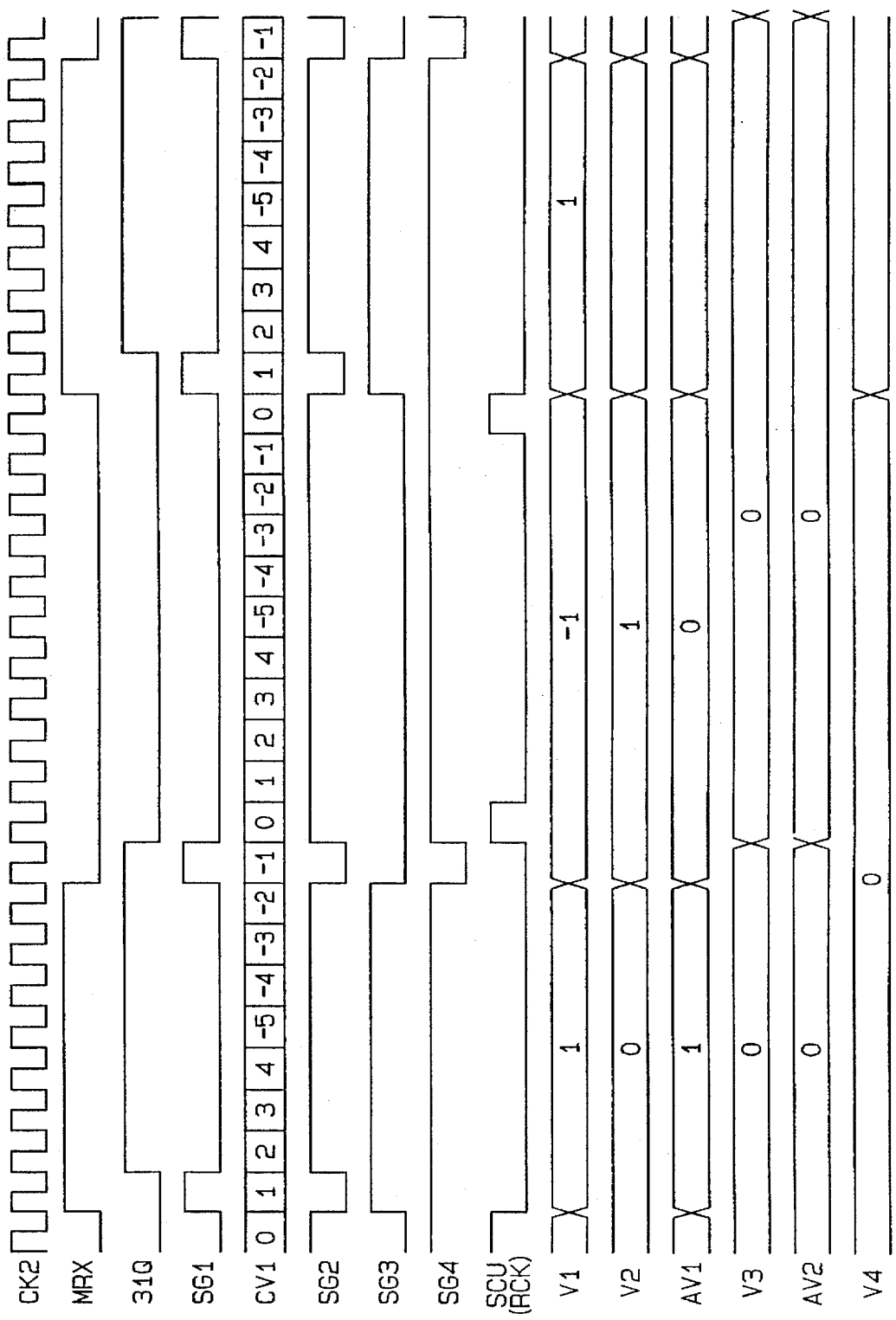
FIG. 9 is a timing diagram illustrating the operation of a phase synchronizing apparatus.

The DFF 31 of the edge signal generator 30 receives the data code portion of the reception data MRX as shown in FIG. 9 based on the pulse of the reference clock CK2. Based on the reception data MRX from the level converter 22 and the output signal 31Q of the DFF 31, the EOR gate 32 produces an edge signal SG1 synchronous with the data code portion of the reception data MRX and outputs the edge signal SG1.

The synchronization counter 33 counts the pulses of the reference clock CK2. The synchronization counter 33 retains and outputs a count value CV1, which sequentially increases up to 4 from 0 and then becomes a negative value and sequentially increases up to 0 from −5 every time it counts the pulse of the reference clock CK2. Every time the synchronization counter 33 counts a predetermined number of pulses, i.e., every time the count value CV1 becomes 0, the synchronization counter 33 sends a count-up signal SCU to the decoding section 29 and the compensation signal generator 38. In this embodiment, the count-up signal SCU is issued every ten pulses. The decoding section 29 outputs the count-up signal SCU as the reception clock RCK. The synchronization counter 33 sequentially sends the count value CV1 to the first adder section 36 of the compensation circuit 34. The number of pulses for the synchronization counter 33 to count up can be set and altered by an external signal.

Figure 10:
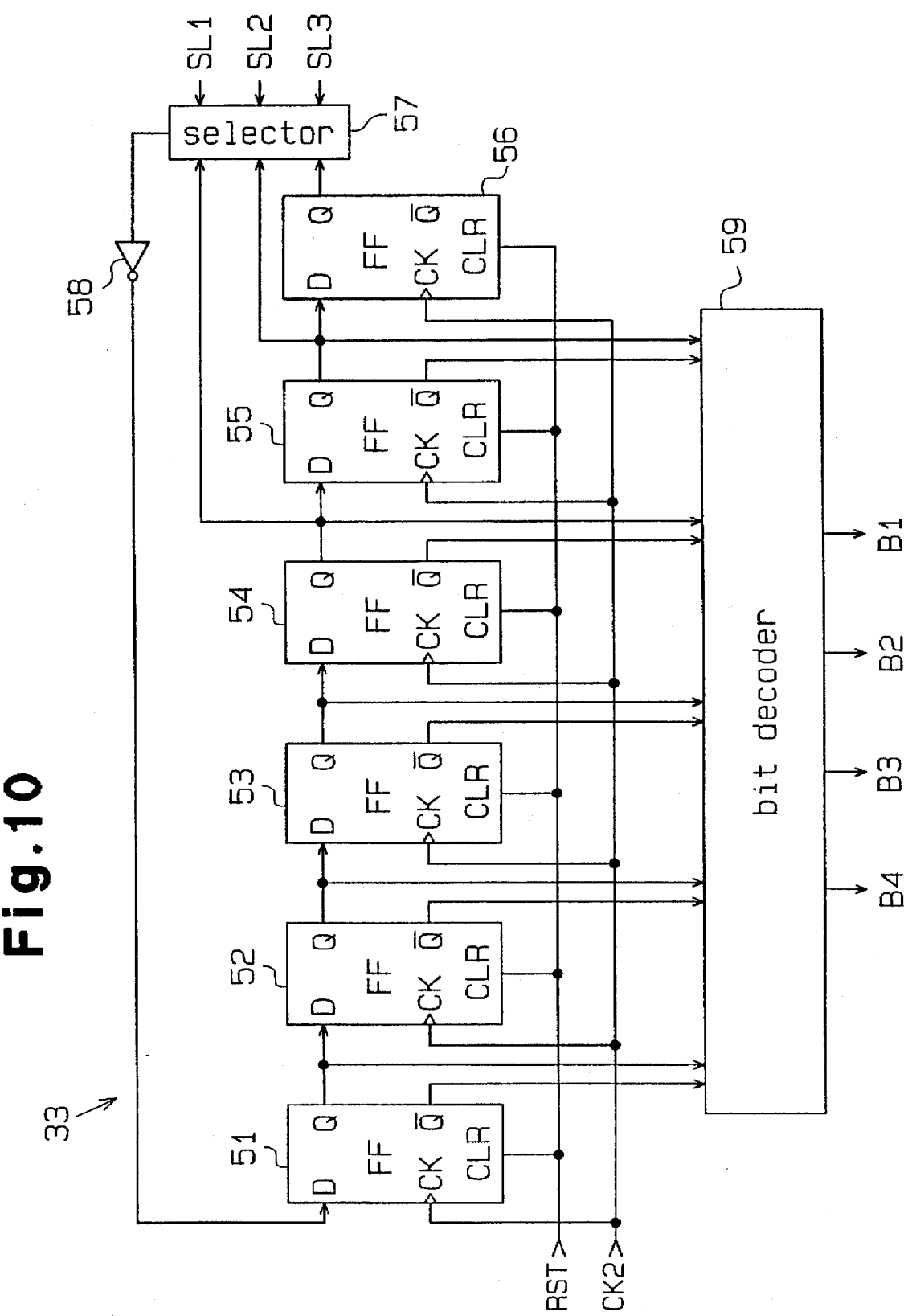
FIG. 10 is a block diagram of the synchronization counter.

As shown in FIG. 10, the synchronization counter 33 has a plurality of DFFs 51 to 56 (six in this embodiment), a selector 57, an inverter 58 and a bit decoder 59. The output signal of the selector 57 is input via the inverter 58 to the data terminal D of the first DFF 51. The output signals 51Q to 55Q of the first to fifth DFFs 51 to 55 are respectively input to the data terminals D of the second to sixth DFFs 52 to 56. The reference clock CK2 is input to the clock terminals CK of the DFFs 51–56, and the reset signal RST is input to the clear terminals CLR of the DFFs 51–56. When the reset signal RST is at an active level, the individual DFFs 51–56 are reset and their output signals 51Q to 56Q become a low (L) level.

The selector 57 receives the output signals 54Q, 55Q and 56Q of the fourth, fifth and sixth DFFs 54, 55 and 56, and also receives the signals SL1, SL2 and SL3 from the compensation signal generator 38. When the signal SL1 is at an active level, the selector 57 selectively outputs the output signal 54Q of the fourth DFF 54. When the signal SL2 is at an active level, the selector 57 selectively outputs the output signal 55Q of the fifth DFF 55. When the signal SL3 is at an active level, the selector 57 selectively outputs the output signal 56Q of the sixth DFF 56.

Figure 11:
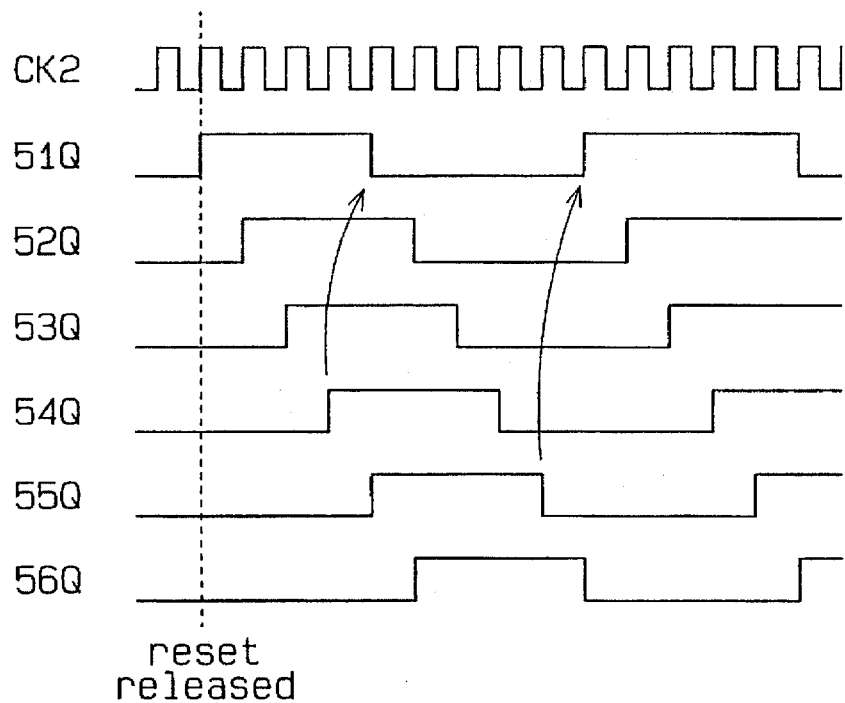
FIG. 11 is a timing diagram for the synchronization counter in a nine modulus mode.
Figure 12:
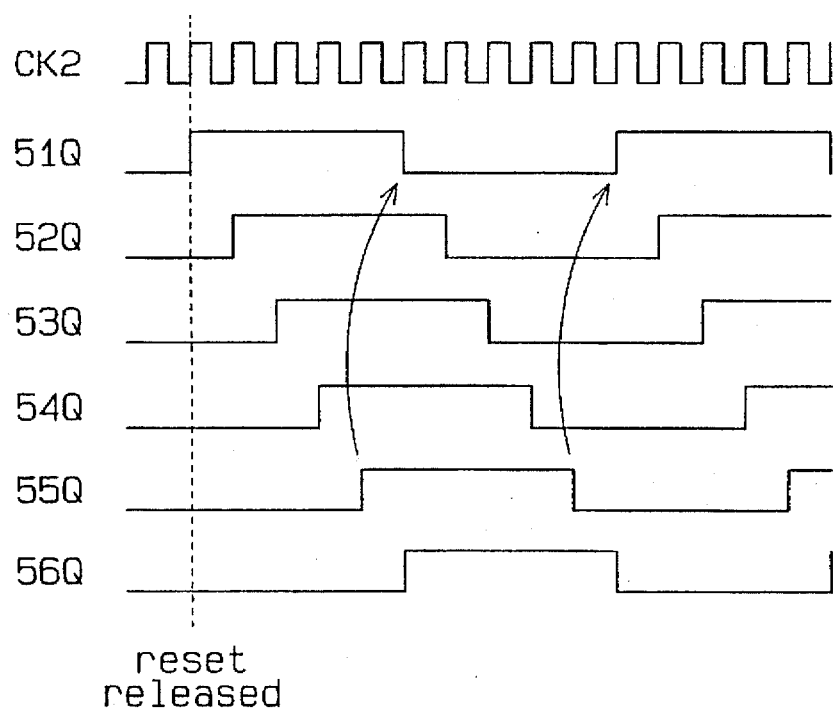
FIG. 12 is a timing diagram for the synchronization counter in a decimal mode.
Figures 13, 14:
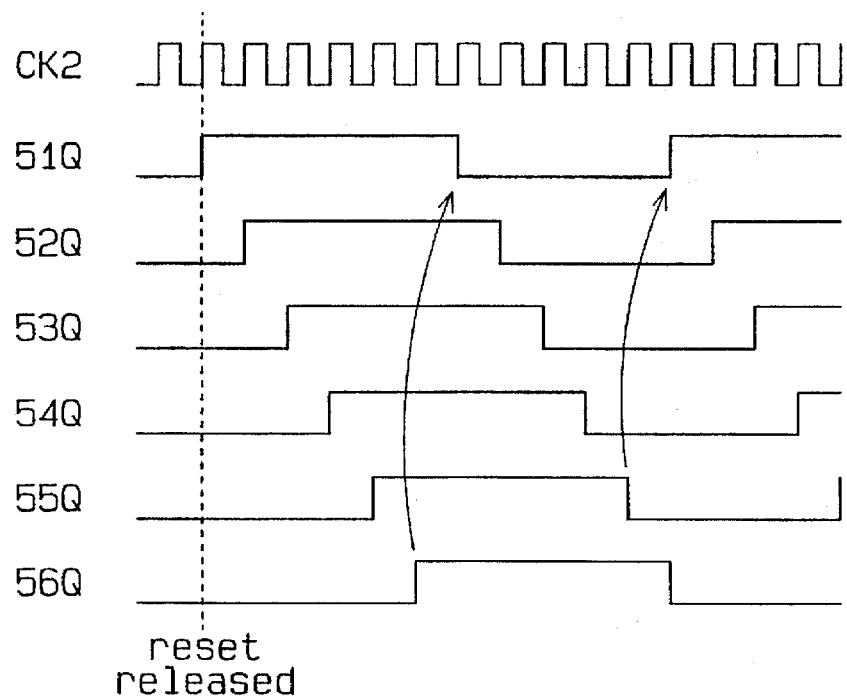
FIG. 13 is a timing diagram for the synchronization counter in an eleven modulus mode.
FIG. 14 is a table showing the relationship between the count value of the synchronization counter and the bit output of a bit decoder.

When the signal SL1 has the active level, therefore, after the reset state is released, the output signals 51Q to 56Q of the DFFs 51–56 continuously change as shown in the chart in FIG. 11, maintain a high (H) level for the duration of four pulses of the reference clock CK2 and maintain the L level for the duration of five pulses of the reference clock CK2. When the signal SL2 has the active level, after the reset state is released, the output signals 51Q to 56Q of the DFFs 51–56 continuously change as shown in the chart in FIG. 12, and the output signals 51Q–56Q maintain the H level for the duration of five pulses of the reference clock CK2 and maintain the L level for the duration of five pulses of the reference clock CK2. When the signal SL3 has the active level, after the reset state is released, the output signals 51Q to 56Q of the DFFs 51–56 continuously change as shown in the chart in FIG. 13, and the output signals 51Q–56Q maintain the H level for the duration of six pulses of the reference clock CK2 and maintain the L level for the duration of five pulses of the reference clock CK2.

The bit decoder 59 receives complementary output signals 51Q to 55Q and /51Q to /55Q of the first to fifth DFFs 51 to 55, and produces bit data B1, B2, B3 and B4 which constitute the count value CV1 based on those received signals. Note that the bit B1 is the least significant bit, while the bit B4 is the most significant bit.

Figure 15:
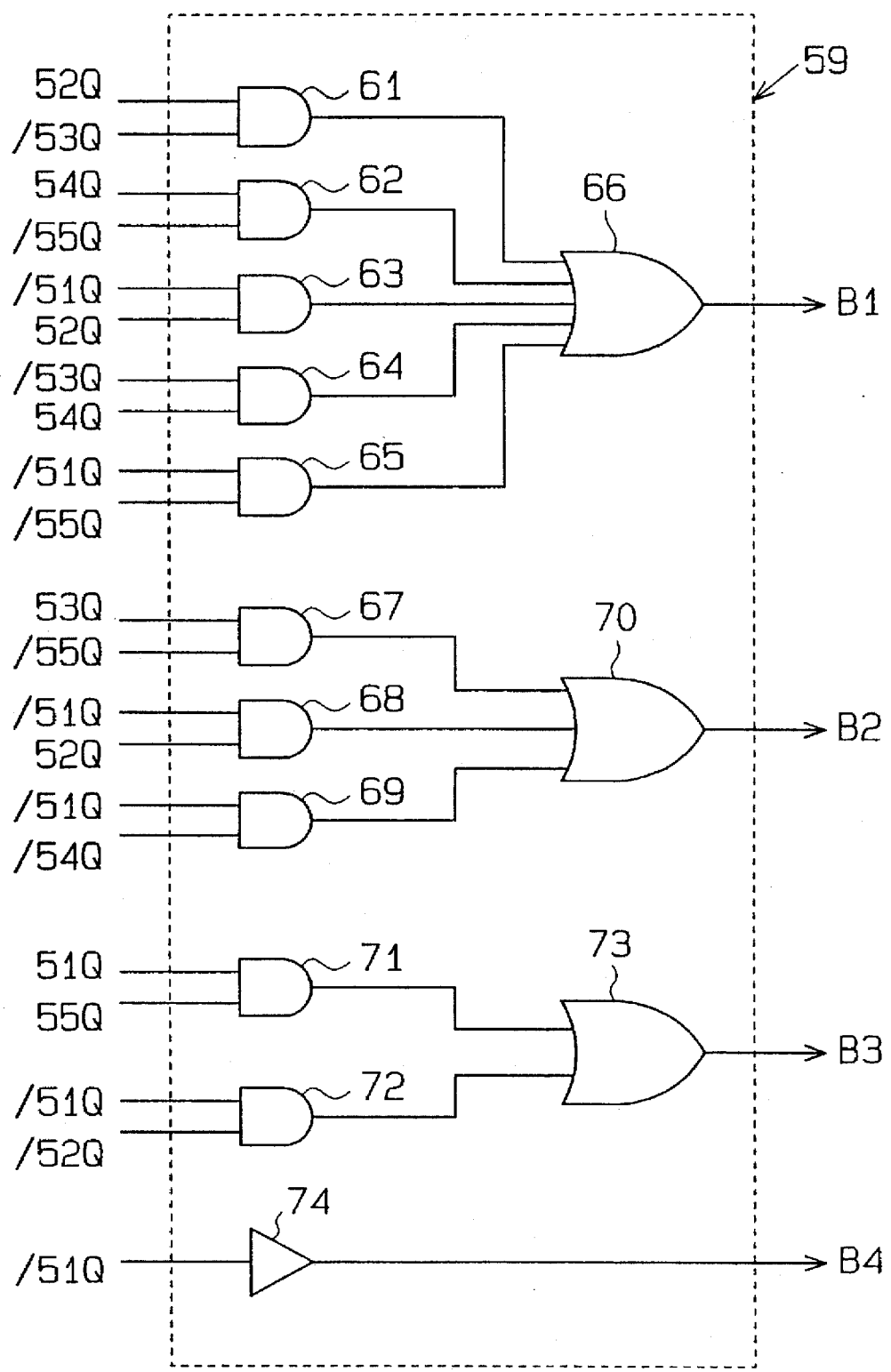
FIG. 15 is a logic circuit diagram of the bit decoder.

The details of the bit decoder 59 will be now explained with reference to FIG. 15. The bit decoder 59 has two-input AND gates 61–65, 67–69, 71 and 72, a 5-input OR gate 66, a 3-input OR gate 70, a 2-input OR gate 73, and a buffer 74.

The AND gate 61 receives the output signals 52Q and /53Q, and the AND gate 62 receives the output signals 54Q and /55Q. The AND gate 63 receives the output signals /51Q and 52Q, the AND gate 64 receives the output signals /53Q and 54Q, and the AND gate 65 receives the output signals /51Q and /55Q. The 5-input OR gate 66 receives the output signals of the AND gates 61–65. The OR gate 66 outputs data "1" as bit data B1 when any one of the outputs of the AND gates 61–65 has a high (H) level, and outputs data "0" as the bit data B1 when all the outputs of the AND gates 61–65 have low (L) levels.

The AND gate 67 receives the output signals 53Q and /55Q, the AND gate 68 receives the output signals /51Q and 52Q and the AND gate 69 receives the output signals /51Q and /54Q. The 3-input OR gate 70 receives the output signals of the AND gates 67–69. The OR gate 70 outputs data "1" as bit data B2 when any one of the outputs of the AND gates 67–69 has a high (H) level, and outputs data "0" as the bit data B2 when all the outputs of the AND gates 67–69 have low (L) levels.

The AND gate 71 receives the output signals 51Q and 55Q, and the AND gate 72 receives the output signals /51Q and /52Q. The 2-input OR gate 73 receives the output signals of the AND gates 71 and 72. The OR gate 73 outputs data "1" as bit data B3 when one of the outputs of the AND gates 71 and 72 has a high (H) level, and outputs data "0" as the bit data B3 when the outputs of both AND gates 71 and 72 have low (L) levels.

The buffer 74 receives the output signal /51Q, and outputs it as bit data B4. In accordance with the output signals of the DFFs 51–55, therefore, the bit output of the bit decoder 59 becomes any combination as shown in the table in FIG. 14.

The frequency divider 39 shown in FIG. 7 receives the aforementioned edge signal SG1, produces a dividing signal SG3 by dividing the frequency of the edge signal SG1 in half, and sends the signal SG3 to the compensation circuit 34.

As shown in FIG. 8, the first adder section 36 includes an inverter 41, a 2-input OR gate 42, first to third registers 43, 44 and 46, and a first adder 45. The inverter 41 inverts the edge signal SG1 received and outputs the inverted signal as the signal SG2. The OR gate 42 receives the signal SG2 and the frequency-divided signal SG3 and outputs a signal SG4 based on both received signals. Therefore, the signal SG4 has a low-level pulse every two low-level pulses of the signal SG2, as illustrated in the chart in FIG. 9.

The first register 43 outputs the count value CV1 of the synchronization counter 33 at the rising edge of the edge signal SG1 as its output value V1. The second register 44 sequentially receives the output value V1 of the first register 43 in synchronism with the rising edge of the edge signal SG1, and simultaneously outputs the value V1 as its output value V2.

The first adder 45 adds the output values V1 and V2 of the first and second registers 43 and 44 and outputs the resultant value as an addition result AV1. The third register 46 sequentially receives the addition result AV1 of the first adder 45 in synchronism with the rising edge of the signal SG4, and simultaneously outputs the result AV1 as its output value V3.

In other words, the first adder section 36 receives the count value CV1 corresponding to the edge signal SG1 output from the edge signal generator 30 one after another, sequentially adds the two consecutive count values CV1 and outputs the addition result as the output value V3.

The second adder section 37 has a second adder 47 and a fourth register 48. The second adder 47 adds the output values V3 and V4 of the third and fourth registers 46 and 48 and outputs the resulting value as an addition result AV2. The fourth register 48 sequentially receives the addition result AV2 of the second adder 47 in synchronism with the rising edge of the frequency-divided signal SG3 and simultaneously outputs the addition result AV2 as its output value V4 to the second adder 47 and the compensation signal generator 38.

The compensation signal generator 38 sets one of the signals SL1, SL2 and SL3 (for setting and altering the number of pulses the synchronization counter 33 counts) to an active level based on the output value V4.

More specifically, when the output value V4 has not reached the previously set positive value or negative value, the signal SL2 is set to the active level. In response to this active signal SL2, the selector 57 of the synchronization counter 33 selects the output signal 55Q, so that the synchronization counter 33 becomes the decimal mode. The count value of the synchronization counter 33 at this time changes in the order of 0, 1, 2, 3, 4, −5, −4, −3, −2, −1, and then repeats again beginning with 0.

When the output value V4 has reached the previously set negative value, the signal SL1 is set to the active level. In response to this active signal SL1, the selector 57 of the synchronization counter 33 selects the output signal 54Q, so that the synchronization counter 33 becomes the nine modulus mode. The count value of the synchronization counter 33 at this time changes in the order of 0, 1, 2, 3, −5, −4, −3, −2, −1, and then repeats again beginning with 0. This quickens the output of the count-up signal SCU, thus compensating for the deviation of the phase of the reception clock RCK.

When the output value V4 has reached the previously set positive value, the signal SL3 is set to the active level. In response to this active signal SL3, the selector 57 of the synchronization counter 33 selects the output signal 56Q, so that the synchronization counter 33 becomes the eleven modulus mode. At this time, the count value of the synchronization counter 33 changes in the order of 0, 1, 2, 3, 4, 5, −5, −4, −3, −2, −1, and then repeats again beginning with 0. This delays the output of the count-up signal SCU, thus compensating for the deviation of the phase of the reception clock RCK.

When receiving the count-up signal SCU from the synchronization counter 33, the compensation signal generator 38 is reset to the case where the signal SL2 is set to the active level.

The decoding section 29 shown in FIG. 7 produces and outputs the reception data RXD consisting of an NRZ code based on the reception data MRX and edge signal SG1, and outputs the count-up signal SCU of the synchronization counter 33 as the reception clock RCK.

The LAN control apparatus according to this embodiment has the following advantages.

The synchronization counter 33 produces the count value CV1, which sequentially increases up to 4 from 0 and then becomes a negative value and sequentially increases up to 0 from −5 every time it counts the pulse of the reference clock CK2, and outputs the count value CV1 to the adder circuit 35. The adder circuit 35 adds the count values CV1 sequentially input from the synchronization counter 33 and sends the signal SL1, SL2 or SL3 directly to the synchronization counter 33 based on the addition result. Accordingly, the phase synchronizing apparatus 28 does not require the fast operating determination circuit and compensation circuit, which are needed by the conventional apparatus. Instead, the phase synchronizing apparatus 28 uses the slow adder circuit 35 with a simple structure instead. Since the phase synchronizing apparatus 28 of this embodiment has fewer fast operating circuits as compared with the conventional phase synchronizing apparatus, the phase synchronizing apparatus 28 consumes less power than the conventional one.

The first adder section 36 sequentially receives the individual edge signals SG1 output from the edge signal generator 30. The adder section 36 sequentially adds the count values CV1 of the synchronization counter 33 which correspond to the two consecutive edge signals. When the frequency of the transmission clock included in transmission data is constant, the rightward data jitter and the leftward data jitter in the reception data MRX become substantially identical as shown in the chart in FIG. 9. At this time, the count value CV1 synchronous with the rising edge of the edge signal SG1 becomes 1, −1, 1, −1 and so forth, for example. Therefore, the sum of the two consecutive count values CV1 becomes 0. According to this embodiment, as apparent from the above, the count value CV1 serves the count-up signal and count-down signal in the prior art, so that the phase synchronizing apparatus of this embodiment requires no circuit of the prior art which generates the count-up signal and count-down signal based on the count value. Therefore, the second adder section 37 need not perform a wasteful operation, thus further contributing to the reduction of the consumed power of the phase synchronizing apparatus 28.

According to this invention, the number of the fast circuit sections in the digital PLL decoder 23 is reduced to accomplish lower power consumption, and the occupying area of the digital PLL decoder 23 is reduced to ensure higher circuit integration.

This invention can reduce the consumed power of the digital PLL decoder 23, thus ensuring lower power consumption of the transmission/reception LSI 1. When this transmission/reception LSI 1 is incorporated in a battery-driven personal computer, the operation time of the personal computer is prolonged.

Although only one embodiment of the present invention has been described herein, it should be apparent to those skilled in the art that the present invention may be embodied in many other specific forms without departing from the spirit or scope of the invention. Particularly, it should be understood that the invention may be embodied in the following form.

The second adder section 37 in the adder circuit 35 in the above-described embodiment may be omitted, and the output value V3 of the third register 46 of the first adder section 36 may be sent to the signal generator 38 so that only one of the signals SL1 to SL3 is set to an active level based on the output value V3.

Therefore, the present examples and embodiment are to be considered as illustrative and not restrictive and the invention is not to be limited to the details given herein, but may be modified within the scope of the appended claims.

What is claimed is:

1. A phase synchronizing apparatus for receiving reception data containing a data code portion synchronous with a transmission clock of a predetermined frequency and producing a reception clock synchronous with said transmission clock, said apparatus comprising:

a synchronization counter for receiving a first reference clock whose frequency is an integer multiple of the frequency of said transmission clock, and counting a number of pulses of said first reference clock to output a count value, said count value including positive and negative values, said synchronization counter outputting a count-up signal as said reception clock when said count value reaches a first predetermined count-up set value; and a compensation circuit, coupled to said synchronization counter, for receiving said count value from said synchronization counter and changing said first predetermined count-up set value in said synchronization counter to one of second and third predetermined count-up set values to compensate for a deviation of a phase of said reception clock, wherein said compensation circuit changes said first predetermined count-up set value to said second predetermined count-up set value when said count value reaches a predetermined positive value and wherein said compensation circuit changes said first predetermined count-up set value to said third predetermined count-up set value when said count value reaches a predetermined negative value.

2. The phase synchronizing apparatus according to claim 1, wherein said count value of said synchronization counter sequentially increases to reach a predetermined positive value from 0, then changes to a predetermined negative value and sequentially increases to 0 from said negative value as said number of pulses of said transmission clock are counted.

3. The phase synchronizing apparatus according to claim 1, further comprising:

an edge signal generator for receiving said reception data and producing an edge signal having a pulse synchronous with an edge of each data code portion of said reception data.

4. The phase synchronizing apparatus according to claim 3, wherein said edge signal generator comprises:

a latch for latching said data code portion of said reception data based on a pulse of a second reference clock whose frequency is an integer multiple of the frequency of said transmission clock; and a logic circuit for producing said edge signal based on said reception data and an output of said latch.

5. The phase synchronizing apparatus according to claim 3, wherein said compensation circuit comprises:

an adder circuit for continuously adding a series of count values of said synchronization counter, said series of count values corresponding to individual pulses of said edge signal produced by said edge signal generator to produce an addition result; and a compensation signal generator for outputting a signal for changing said first predetermined count-up set value in said synchronization counter when the addition result from said adder circuit reaches one of said predetermined positive and negative values.

6. The phase synchronizing apparatus according to claim 5, wherein said adder circuit comprises:

a first adder section for sequentially adding count values of said synchronization counter corresponding to two consecutive pulses of said edge signal output from said edge signal generator to produce first addition results;

a second adder section, coupled to said first adder section, for sequentially adding the first addition results from said first adder section to produce second addition results; and a compensation signal generator for outputting a signal for changing said first predetermined count-up set value in said synchronization counter when the second addition results from said second adder section reaches one of said predetermined positive and negative values.

7. A phase synchronizing apparatus for receiving reception data containing a data code portion synchronous with a transmission clock of a predetermined frequency and producing a reception clock synchronous with said transmission clock, said apparatus comprising:

a synchronization counter for receiving a first reference clock whose frequency is an integer multiple of the frequency of said transmission clock, and counting a number of pulses of said first reference clock to output a count value, said count value including positive and negative values, said synchronization counter outputting a count-up signal as said reception clock when said count value reaches a first predetermined count-up set value;

a compensation circuit, coupled to said synchronization counter, for receiving said count value from said synchronization counter and changing said first predetermined count-up set value in said synchronization counter to one of second and third predetermined count-up set values to compensate for a deviation of a phase of said reception clock; and an edge signal generator for receiving said reception data and producing an edge signal having a pulse synchronous with an edge of each data code portion of said reception data, wherein said compensation circuit comprises an adder circuit for continuously adding a series of count values of said synchronization counter, said series of count values corresponding to individual pulses of said edge signal produced by said edge signal generator to produce an addition result, and a compensation signal generator for outputting a signal for changing said first predetermined count-up set value in said synchronization counter when the addition result from said adder circuit reaches one of said predetermined positive and negative values, and wherein said adder circuit comprises a first adder section for sequentially adding count values of said synchronization counter corresponding to two consecutive pulses of said edge signal output from said edge signal generator to produce first addition results, a second adder section, coupled to said first adder section, for sequentially adding the first addition results from said first adder section to produce second addition results, a compensation signal generator for outputting a signal for changing said first predetermined count-up set value in said synchronization counter when the second addition results from said second adder section reaches one of said predetermined positive and negative values, a first register for sequentially retaining said count value as an output value, a second register for sequentially retaining the output value of said first register, a first adder for adding the output values of said first and second registers to produce an addition result, and a third register for retaining the addition result from said first adder.

8. The phase synchronizing apparatus according to claim 7, wherein said second adder section comprises:

a second adder;

a fourth register for retaining an output value of said second adder, wherein said second adder adds the output values of said third and fourth registers.

9. A decoder comprising:

a phase synchronizing apparatus as recited in claim 1; and a decoding section for outputting data consisting of an NRZ (Non Return to Zero) code based on each data code portion of said reception data and for outputting said count-up signal from said synchronization counter as said reception clock.

10. A semiconductor integrated circuit device comprising:

a transceiver for receiving data transferred via a transfer path and having a data code portion synchronous with a transmission clock of a predetermined frequency;

a decoder as recited in claim 9, said decoder for producing a reception clock synchronous with said transmission clock in reception data received by said transceiver based on said reception data and outputting data consisting of an NRZ code based on each data code portion of said reception data received by said transceiver;

a data link controller for latching said data consisting of said NRZ code based on said reception clock; and a system interface provided to output said data latched by said data link controller.

* * * * *